Figures 2A, 2B, 2C, 2D, 2E:
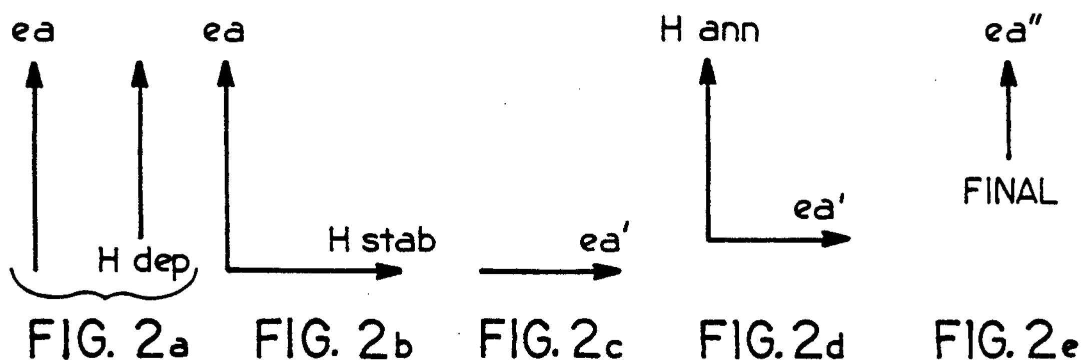

United States Patent [19]

Jagielinski

[11] Patent Number: 4,994,320

[45] Date of Patent: Feb. 19, 1991

[54] THIN MAGNETIC FILM HAVING LONG TERM STABILIZED UNIAXIAL ANISOTROPY

[75] Inventor: Tomasz M. Jagielinski, Encinitas, Calif.

[73] Assignee: Eastman Kodak Company, Rochester, N.Y.

[21] Appl. No.: 203,953

[22] Filed: Jun. 8, 1988

[51] Int. Cl.[5] .............................................. G11B 23/00

[52] U.S. Cl. .................................... 428/336; 428/692; 428/694; 204/192.2; 427/132; 360/126

[58] Field of Search ....................... 428/900, 692, 694; 204/192.2; 427/132; 360/126

[56] References Cited

U.S. PATENT DOCUMENTS 4,236,946 12/1980 Aboaf et al. ........................ 148/108
4,600,488 7/1986 Imura et al. .................... 204/192 N
4,608,297 8/1986 Shimada et al. .................... 428/215
4,663,683 5/1987 Youda et al. ........................ 360/113
4,825,325 4/1989 Howard ............................ 360/113

*Primary Examiner*—George F. Lesmes
*Assistant Examiner*—Stevan A. Resan
*Attorney, Agent, or Firm*—Dennis P. Monteith

[57] ABSTRACT

An amorphous thin magnetic film having stabilized uniaxial anisotropy of thickness 200–1000 angstroms is fabricated from an alloy of composition CoX where X is one of the elements Zr, Nb, Mo, Ta, Ru, Rh, Pd, Hf, Ti, W, Re, Os, Ir. The invention teaches setting the magnitude of the uniaxial anisotropy of the film at a predetermined magnitude and stabilizing the anisotropy against long term change through (1) the addition of controlled amounts of silicon to the alloy, (2) cladding each face of the film with an Si02 layer, and (3) stabilizing and annealing the resultant clad film in a two step process.

5 Claims, 4 Drawing Sheets

THIN MAGNETIC FILM HAVING LONG TERM STABILIZED UNIAXIAL ANISOTROPY

BACKGROUND OF THE INVENTION

1. Field of the Invention

This invention relates to an amorphous thin magnetic film suitable for use as a soft adjacent layer in a magnetoresistive head, and in particular to a thin film of thickness from 200–1000 angstroms having long term stabilized uniaxial anisotropy.

2. Description Relative to the Prior Art

The use of thin magnetic films is well known in magnetic head technology. Such films are particularly useful in the fabrication of magnetoresistive (MR) elements or soft adjacent biasing layers (SAL) in magnetoresistive heads. The magnetic characteristics necessary in SAL applications, such as high saturation magnetization, high permeability, and low coercivity dictate that the thin films be amorphous; the crystalline phase generally exhibiting too high a coercivity and too low a resistivity for magnetic head use.

Among the materials suitable for SAL applications are permalloy, and amorphous alloys made from a transition metal such as cobalt and metal elements required for stabilizing the amorphous phase including Zr, Nb, Mo, Ta, Ru, Rh, Pd, Hf, Ti, W, Re, Os, and Ir. These materials lend themselves to sputtering techniques in the fabrication of amorphous thin films.

CoX alloys, where X is one of the elements listed above, are of particular interest as SAL elements because of their comparatively high magnetization saturation, high resistivity and low magnetoresistance. In a SAL type magnetoresistive head, a sense current flows through the MR element to provide the dual function of detection of the signal due to the change in the MR element resistance induced by the signal field, and to induce a magnetic field in the SAL which gives rise to the bias field at the MR element. When the soft adjacent layer is as conductive as the MR layer, a troublesome problem has been the shorting of the soft adjacent layer element to the magnetoresistive element due to, for example, pin holes in very thin insulation separating the two elements. Under this condition, a relatively conductive SAL material, such as permalloy having a conductivity of approximately 20 ohm-cm), will shunt the sense current in the MR element resulting in head performance deterioration. Additionally, if the SAL has an appreciable magnetoresistance characteristic it will itself act as an MR element and contribute to the overall magnetoresistive changes of the head due to the signal field, with additional detriment to performance. The CoX alloys have proven an effective substitute for permalloy as a soft adjacent layer material. ("CoZrMo Amorphous Films as a Soft Adjacent Layer for Biasing Magnetoresistive Elements with a Current Shunt Layer", Yamada et al, 32nd Annual Conference on Magnetism and Magnetic Materials, Chicago, Ill., November, 1987.) Because of its higher resistivity in the range of 100 micro-ohm-cm a CoX soft adjacent layer, when used with a permalloy MR element, will only shunt about 1/5 of the sense current from the magnetoresistive element if shorts occur between the magnetoresistive element and the soft adjacent layer. Since the magnetoresistance for amorphous films is smaller by a factor of 10 of that of permalloy, even if current flows in the SAL due to a short, its contribution to the magnetoresistive change of the head is negligible.

While the CoX alloys show promise in alleviating problems arising in thin film head construction, the CoX alloys known in the prior art do not exhibit stable magnetic anisotropy field values when fabricated in the optimum thickness for an SAL. In a magnetoresistive head having soft adjacent layer biasing, it is desirable that the soft adjacent layer be operated in a saturated state making the bias field at the magnetoresistive element independent of changes in the sense current which generates the bias field. This, in turn, means the SAL must be thin enough so that the field of the sense current saturates it. In general, the optimum SAL thickness is in the range 200–1000 angstroms; thicker SAL elements are difficult to saturate for acceptable separation distances between the MR element and the SAL, and for acceptable magnitudes of current flow in the MR element. In addition, it will be appreciated that the continuing effective operation of a magnetic head depends upon the stability of the magnetic parameters of the materials comprising the head. It is known that the field required to saturate a thin uniaxial film is proportional to the anisotropy field of the film. As mentioned above, CoX SAL elements exhibit instability of the anisotropy field when made thin enough to be suitable for SAL service. This instability is reflected in changes in the saturation of the layer with resultant instability in the bias of the magnetoresistive element leading to undesirable variations in the head response.

The present invention addresses this problem, and provides a solution by disclosing optimally dimensioned CoX alloy films for use as SAL elements, so processed to have anisotropy fields that are stable and substantially immune from long term changes.

SUMMARY OF THE INVENTION

The invention makes feasible the fabrication of a thin amorphous magnetic film of thickness 200–1000 angstroms from alloys having the composition CoX, where X is one of the previously listed elements. The invention teaches setting the magnitude of the uniaxial anisotropy of the film at a predetermined magnitude and stabilizing the anisotropy against long term change through (1) the addition of controlled amounts of silicon to the alloy, (2) cladding each face of the film with an SiO2 layer, and (3) stabilizing and annealing the resultant clad film in a two step process. In the prior art, the CoX amorphous film in the thickness range of 200 angstroms to above 500 angstroms exhibits severe instability of anisotropy. It is hypothesized this is due to the large ratio of surface area to volume of the film. In such a thin film, the resultant film anisotropy is thought to be dominated by the surface anisotropy, which in the prior art has been uncontrollable. The present invention solves this problem by stabilizing the film surfaces through the addition of silicon, and by a processing procedure at elevated temperature in a specified magnetic field.

The film of the invention is fabricated by means of a d.c. sputtering technique utilizing a CoX alloy target and another target of Si. The material is sputtered onto a substrate having an SiO2 layer previously deposited as a cladding layer; the sputtering taking place in a magnetic field whose direction determines the direction of the easy axis of the resultant film. After the proper thickness of amorphous film has been deposited, a second cladding layer of SiO2 is overlaid on the film. During subsequent stabilization and annealing, the cladding protects the film at the interface between the film and the substrate, and at the interface between the film and the environment of the processing chamber. Without the cladding it is not possible to control the magnitude of the anisotropy and to stabilize the anisotropy field value for such a thin film. With the cladding as taught by the invention, the anisotropy may be established at a predetermined value which will remain stable over the long term.

Stabilization and annealing take place through a two step Process. The clad film is first stabilized for a specified length of time at an elevated temperature in a magnetic field applied in the plane of the film, preferably perpendicular to the initial direction of the easy axis of the deposited film. After stabilization, the clad film or the magnet is rotated by 90 degrees relative to its initial position, and the film is then annealed at elevated temperature for a specified length of time in a magnetic field whose direction is now perpendicular to that used during the stabilization step, i.e., in the direction of the original "as deposited" anisotropy field direction.

DESCRIPTION OF THE INVENTION

Figure 4:
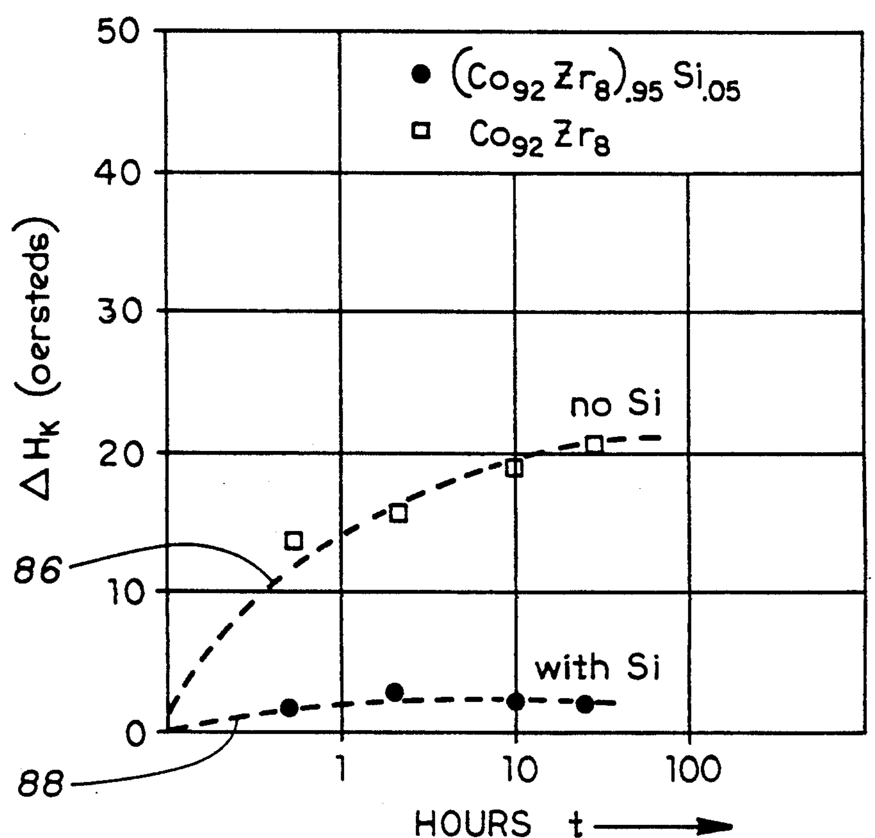
Figure 3:
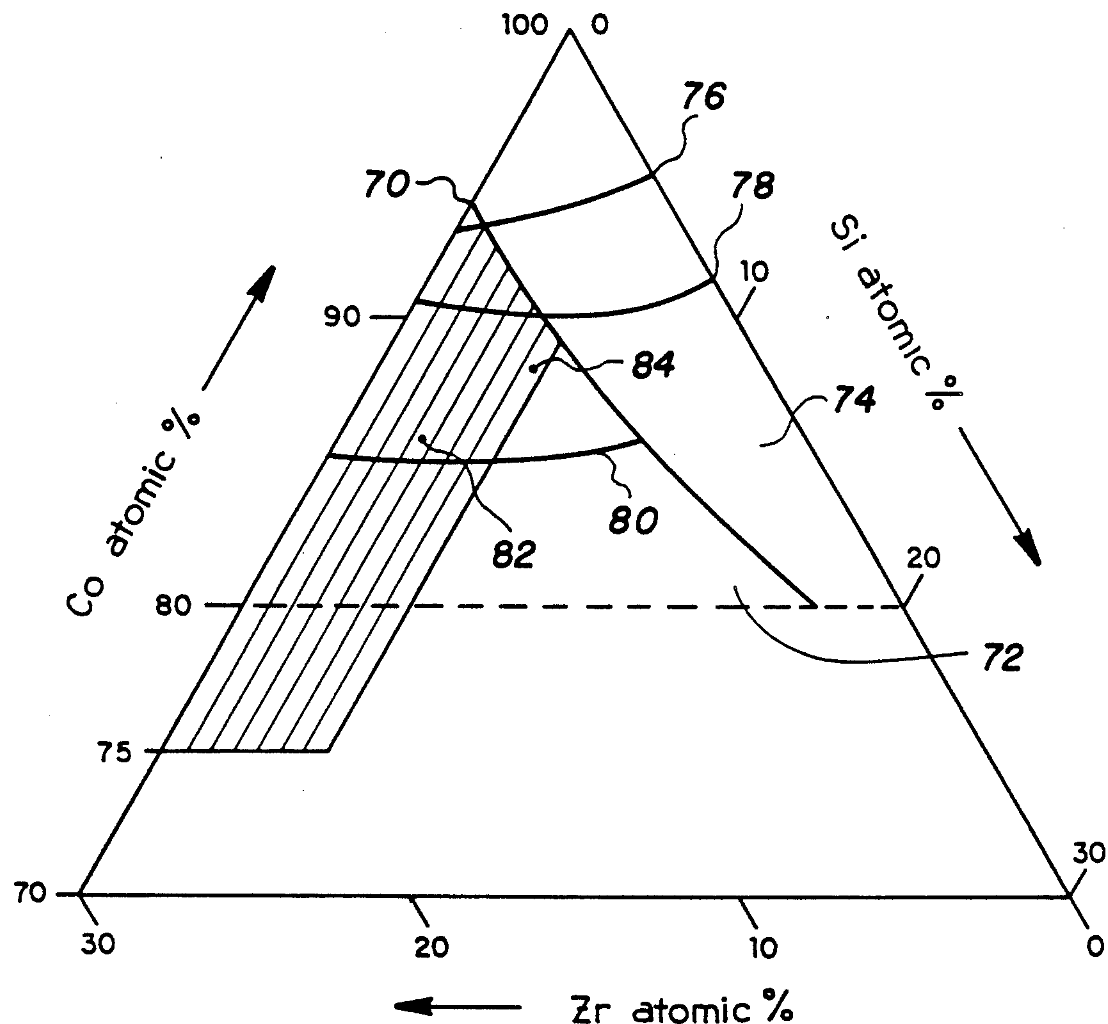
Figure 1:
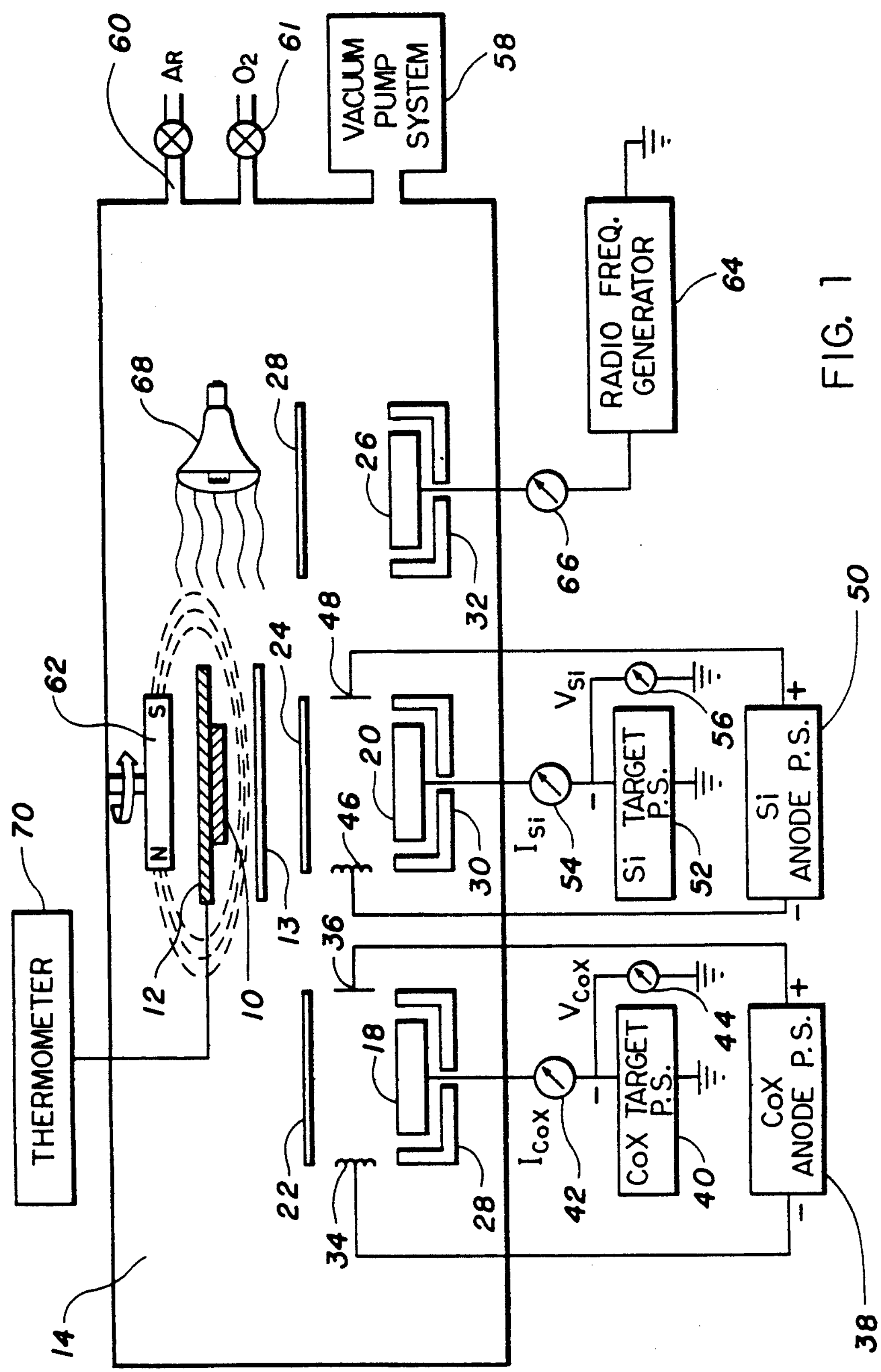

The invention will be described in relation to the figures, of which:

FIG. 1 is a schematic drawing of apparatus for deposition of the thin film of the invention, FIG. 2*a*–FIG. 2*e* are schematic drawings representing the steps of stabilization and annealing of the clad film according to the invention, FIG. 3 is a phase diagram of alloy compositions comprised of cobalt, zirconium, and silicon, and FIG. 4 are graphs showing the improvement in stability of the anisotropy field of a thin film fabricated according to the invention.

The deposition of the amorphous thin film of the invention is performed using d.c. triode sputtering techniques known in the prior art. Referring to FIG. 1, a substrate 10 is mounted in a holder 12 located in a sputtering chamber 14. A movable aperture (not shown) uncovers the substrate 10 for deposition. A target 18 containing the CoX alloy to be sputtered, and a silicon target 20 are mounted in the chamber 14 and shutters 22 and 24 allow the selection of the targets 18, 20. Additionally, an SiO2 target 26, for deposition of the cladding layers of the film and associated shutter 28 is included in the chamber 14. The targets 18, 20, 26 are provided with shields 28, 30, 32 respectively which prevent back sputtering from the targets. Each of the targets 18, 20 are excited by means of separate triode sputtering systems. The system associated with CoX target 18 consists of a cathode 34, an anode 36 and an anode power supply 38; a target power supply 40 with current meter 42 and voltmeter 44 for monitoring the power supplied to the CoX target 18 during sputtering. The corresponding elements for the Si target 20 are cathode 46, anode 48, anode power supply 50, target power supply 52, target current meter 54 and target voltmeter 56.

In sputtering a film, the chamber 14 is evacuated by means of a vacuum pump system 58, and argon gas is introduced into the chamber 14 through a port 60. As is known in the art, when a voltage is applied, for example, between the cathode 34 and the anode 36 by means of the power supply 38, the argon gas in the chamber 14 becomes ionized causing a plasma between the cathode 34 and the anode 36. Argon ions in the plasma will migrate towards an uncovered target, i.e. CoX target 18, and will bombard the target. The bombardment ejects atoms of the target which deposit as a film on the substrate 10. A magnet 62 provides a field at the substrate 10 so that the sputtered material is deposited under the influence of a magnetic field which defines the direction of the easy axis of the resultant film.

In the fabrication of a film, the first step consists of sputtering a 1000–3000 angstrom thick SiO2 cladding layer onto the substrate 10 by means of the SiO2 sputtering target 26. As described above, the alloy components are sputtered by means of a d.c. triode sputtering technique. SiO2, on the other hand, is deposited using an r.f. reactive sputtering method. The shutter 13 at the substrate 10 is opened as is the shutter 28 at the SiO2 target: shutters 22 and 24 are closed. A small quantity of O2 is admitted by opening valve 61. R.f. power is supplied to the target 26 from an r.f. generator 64 whose output is monitored by power meter 66. The r.f. power at the target 26 excites a plasma in the residual gas in the chamber, and argon atoms of the plasma bombard the SiO2 target ejecting SiO2 molecules which deposit on the substrate 10. The thickness of the SiO2 layer is determined by the deposition time and the r.f. power at the target 26; one angstrom of SiO2 is deposited per second of sputtering time. After the SiO2 deposition, the shutter 28 is closed and the CoX and Si targets 18, 20 are uncovered by opening the shutters 22, 24. Sputtering of the CoXSi film proceeds by activating the CoX and the Si triode sputtering apparatuses previously described, and simultaneously sputtering from the CoX target 18 and the Si target 20. The CoX target has been alloyed with the proportions of Co and element X appropriate for the final amorphous film. The amounts of CoX and Si in the final film is controlled by the powers respectively supplied to the CoX and Si targets during deposition. Alternately, a single CoXSi alloyed target may be used to deposit the CoXSi film. Upon completion of the CoXSi sputtering operation, the CoX and Si targets are shuttered closed and the SiO2 target 26 is reactivated and a 200–1000 angstrom cladding layer is deposited over the CoXSi layer. The thickness of this second layer is determined by the proposed use of the film. If the layer is to be used as a soft adjacent layer in a magnetoresistive head, the distance between the soft adjacent layer and the magnetoresistive element is typically 200–1000 angstroms.

The stabilization and annealing process may be conveniently performed without removing the deposited film on the substrate 10 from its position in the sputtering chamber 14. The same magnet 62 used during the deposition phase is utilized during the next operations, and the direction of the magnetic field relative to the easy axis of the film may be varied by either rotating the magnet 62 or the substrate holder 12. A radiant lamp 68 located within the sputtering chamber 14 acts as a heat source to irradiate and thereby raise the temperature of the film, and a conventional temperature measuring device 70, such as a thermocouple, continuously monitors the temperature of the film on the substrate 10 to insure that the temperature of the film remains below the crystallization temperature.

Referring to FIG. 2*a*, the direction of the film's anisotropy easy axis, ea, is shown in the same direction as the field Hdep in which it was deposited. In FIG. 2*b*, in the first step of the annealing and stabilization process, the external magnetic field Hstab is positioned parallel to the plane of the film and perpendicular to the direction of the anisotropy easy axis, ea, of the film as deposited. This is accomplished by either rotating the magnet 62 or the substrate holder 12 by 90 degrees (FIG. 1). The film's anisotropy is now stabilized by maintaining the film at a temperature below the crystallization temperature for a length of time such that the value of anisotropy does not change. At this time, the anisotropy easy axis, ea', direction is as shown in FIG. *2c*, i.e. it has rotated in the plane of the film into the direction of the stabilizing field Hstab. The film's anisotropy is now stable but may be greater in value than the final targeted value, and is perpendicular to the desired final direction. Referring to FIG. *2d*, the magnet 62 or substrate holder 10 is then rotated by 90 degrees so that the field Hann is perpendicular to the stabilized anisotropy easy axis, ea', direction and the film is annealed at a specified temperature until the anisotropy value equals the targeted value. The stabilized and annealed anisotropy easy axis, ea", direction being now in the direction shown in FIG. *2e*, i.e. in the same direction as deposited. However, the anisotropy field has now been adjusted in magnitude and has been stabilized.

EXAMPLE

An amorphous thin film comprising CoZrSi having stabilized anisotropy was fabricated following the teaching of the invention. Referring to FIG. 3, which is a phase diagram of CoZrSi, a line 70 defines the boundary between the amorphous phase 72 and the crystalline phase 74. A line 76 is the locus of compositions which have a magnetization value of 15 kilogauss, and lines 78 and 80 are the corresponding lines for magnetization values of 13 kilogauss and 10 kilogauss respectively. In the practice of the invention, amorphous alloys with magnetization greater than 10 kilogauss are preferred, and such alloys are represented by a typical point 82. Alloy compositions within the cross hatched region, when fabricated into films of thickness in the range from 200–1000 angstroms, are suitable as soft adjacent layers for magnetoresistive heads, and may be processed to have long term easy axis anisotropy stability.

Referring again to FIG. 1, the chamber 14 was evacuated by the pump system 58 and backfilled with 90% argon through port 60 and 10% O2 to a pressure of 2 millitorr. The shutter 28 was opened and a SiO2 cladding layer was dePosited on the silicon substrate 10 by r.f. sputtering at a power of 1.5 kilowatts from the r.f. generator 64 for a period of 3000 sec. Shutter 26 was then closed and shutters 22, 24 opened exposing the CoZr 22 and Si 24 targets. The Ar-O2 mixture was pumped out, and argon at a pressure of 2 millitorr was established. The composition of the CoZr target was Co92 (atomic %) and Zr8 (atomic %); the CoZr composition was designed to be 95% of the final alloy and the Si was designed to be 5%. This corresponds to the point 84 of FIG. 3 within the amorphous area of the phase diagram, FIG. 3. The magnet 62 provided a field of 150 oersteds at the substrate 10, and the direction of its field established the direction of the film anisotropy easy axis. For a film thickness of 200 angstroms, sputtering of CoZr from target 22 was performed at a power of 500 watts, determined by means of current meter 42 and voltmeter 44, for 120 sec, and sputtering of Si from target 24 was performed at 150 watts, determined by current meter 54 and voltmeter 56, for 120 sec. The shutter 39 was reactivated, 10% O2 was readmitted by means of valve 61, and a cladding layer of SiO2, thickness 1000 angstroms, was sputtered onto the film at a power of 1.5 kilowatts, determined by power meter 66, for 1000 sec.

Upon completion of sputtering, the stabilization and annealing operations were performed without removing the deposited film from the sputtering chamber. The magnet 40 was rotated 90 degrees so its field direction was perpendicular to the easy axis direction of the "as deposited" film. The radiant heat lamps 42 were activated and the film was heated to a temperature of 400 degrees C for a period of 1 hour. After that time, the film had a stable anisotropy of approximately 15 Oe. The magnet was then rotated by 90 degrees and the film was annealed for 1 hour during which time its easy axis anisotropy field magnitude was reduced to about 5 oersteds.

Referring to FIG. 4, the curve 86 shows the change of uniaxial anisotropy, $\Delta Hk$, with time of a CoZr film without the addition of Si, and the curve 48 which shows the anisotropy field change for a film fabricated in accordance with the teaching of the invention. Both curves are for films previously stabilized at 400 degrees C and then annealed at 275 degrees C. It will be appreciated that after the stabilization process the film fabricated in accordance with the invention (88) had a stable uniaxial anisotropy even when annealed at 275 degrees C for over 10 hours. In comparison, a film fabricated from CoZr without the addition of Si (86), showed continued changes in the uniaxial anisotropy field as annealing continued.

It is understood in the art that designations such as "stable" applied to the previously described processes are to be interpreted in view of the Arrehenius relationship which governs the kinetics of reactions. This relationship is of the form, "rate of reaction = constant x $\exp(-Q/kT)$", where Q is the activation energy, k is Boltzmann's constant, and T is the absolute temperature. The change in uniaxial anisotropy results from a reaction which is generally thought to be controlled by the Arrehenius relation. The state of the CoZrSi amorphous film of FIG. 4 is seen to be stable at a temperature of 275 degrees C, and it will be appreciated from the exponential form of the Arrehenius relation that the film will retain its uniaxial anisotropy characteristics for practically an indefinite period when maintained at a lower operating temperature.

Figure 5:
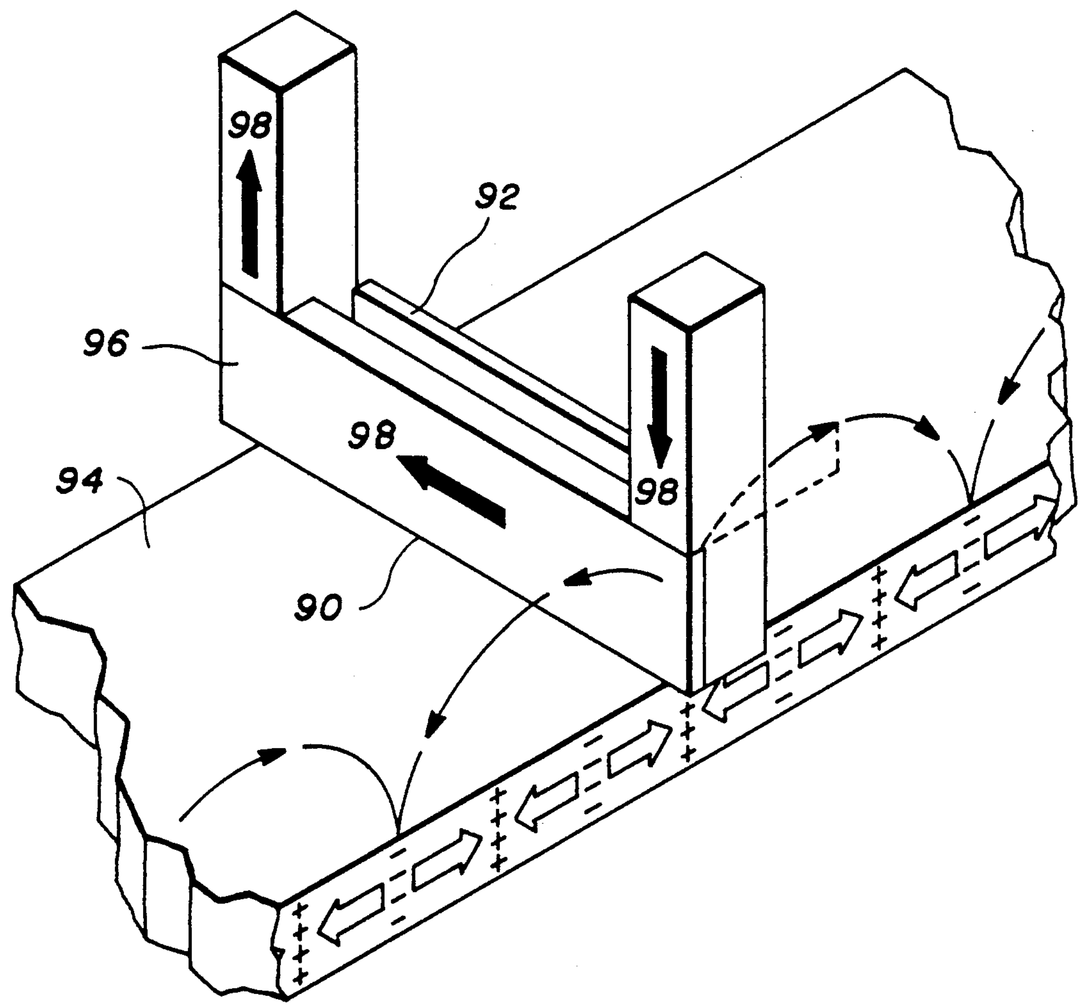

Referring to FIG. 5, an MR head 90 utilizing an SAL 92 in accordance with the invention is seen in contact with a prerecorded medium 94. The elements of the MR head 90 include an MR element 96 through which a sense current 98 flows, and adjacent to the MR element 96 is the thin SAL 92 which generates the bias at the MR element 96 as a result of the current 98, as previously described.

The invention has been described in detail with particular reference to preferred embodiments thereof, but it will be understood that variations and modifications can be effected within the spirit and scope of the invention.

What is claimed is:

1. An improved amorphous magnetic film having a defined uniaxial anisotropy field, said film comprising:
   a. Co, Si and one of the elements from the group consisting of Zr, Nb, Mo, Ta, Ru, Rh, Pd, Hf, Ti, W, Re, Os, Ir,
   b. said film having a thickness of 200 to 1000 angstroms, and
   c. an SiO2 cladding layer sputter deposited to said film, wherein the magnitude of said uniaxial anisotropy field of said amorphous film is substantially constant at temperature below the crystallization temperature of said amorphous film.

2. The film of claim 1 wherein the atomic percentage of Co is between 75-95%, the atomic percentage of Si is greater than 0.5% and less than 5%, and the atomic percentage of the remaining element is 100% minus the sum of the atomic percentage of Co and the atomic percentage of Si.

3. The film of claim 2 wherein the resistivity of said film is greater than 80 micro-ohm-cm.

4. The film of claim 2 wherein the magnetization of said film is greater than 5 kilogauss.

5. In a magnetoresistive head utilizing soft adjacent layer biasing, the improvement comprising:

a. an amorphous magnetic film having an atomic percentage of Co between 75-95%, and atomic percentage of Si greater than 0.5% and less than 5%, and an atomic percentage of one of the elements Zr, Nb, Mo, Ta, Ru, Rh, Pd, Hf, Ti, W, Re, Os, Ir, equal to 100% minus the sum of the atomic percentage of Co and the atomic percentage of Si, b. said film having a thickness of 200 to 1000 angstroms, c. a cladding layer of SiO2 sputter deposited to said film, and d. said film having a uniaxial anisotropy field of a magnitude substantially constant at temperatures below the crystallization temperature of said film.

* * * * *